UNITED STATES PATENT OFFICE 2,658,080

MONOBENZYL ETHER OF DIETHYL-STILBESTROL

Frank Charles Schmelkes, deceased, late of Montclair, N. J., by Margarete Schmelkes, executrix, Montclair, N. J., assignor to Wallace & Tiernan Company, Inc., a corporation of New Jersey No Drawing. Application May 29, 1951, Serial No. 228,986

1 Claim. (Cl. 260—613)

This invention relates to the preparation of a new chemical compound, and particularly to a novel substance which may be defined as a derivative of diethylstilbestrol and which has been found to have useful properties of an unexpected character. Since the original discovery by Dodds, that $\alpha$-$\alpha'$-diethylstilbene-4-4'-diol (now usually known by its commonly accepted name diethylstilbestrol, or simply as stilbestrol) possesses powerful estrogenic properties, a number of derivatives of diethylstilbestrol were prepared with the aim of producing synthetic substances of estrogenic character which would be of more powerful effect in that respect or would be better tolerated while serving their estrogenic function. Thus, for example, one prior disclosure has related to monoalkyl ethers of stilbestrol in which a short alkyl radical containing one or two carbon atoms is introduced into the molecule (U. S. Patent No. 2,385,468, E. E. Reid, September 25, 1945). Disclosure has likewise been made of the monoalkyl ethers (involving relatively short alkyl radicals) of 3,4-di-p-hydroxyphenylhexane, usually referred to as hexestrol, i. e. as embraced in U. S. Patent No. 2,385,472, granted September 25, 1945, on the application of the present inventor.

The novel compound of the instant invention is the monobenzyl ether of diethylstilbestrol, which it has been found possible to prepare by procedures as described below and which has been found to have unusual properties distinguishing it from substances exemplified by the monoalkyl ethers mentioned above. Specifically, the monobenzyl ether has given evidence of special therapeutic value because it possesses some of the pituitary-stimulating properties of the estrogens and of some synthetic diethylstilbestrol derivatives, but at the same time is at most only weakly estrogenic. In consequence it is possible to produce, through the administration of the present compound, some of the pituitary-stimulating and other metabolic effects characteristic of certain hormones of the estrogen type without affecting the gonads or other sex organs of either males or females. Evidence has indicated that the compound is well tolerated and is thus effective for the stated purposes while avoiding unwanted results that cannot be avoided with other substances of the character mentioned.

It has been found that the new compound can be prepared in a number of ways, for example by methods similar to those usually employed for the synthesis of diethylstilbestrol, and also, very conveniently, by benzylating diethylstilbestrol, e. g. by treating the latter, in an alcoholic solution in the presence of sodium ethoxide, with a benzyl halide. In these operations, particularly in benzylating diethylstilbestrol under circumstances calculated to yield the monobenzyl ether directly, the mixture resulting from the reaction is usually found to contain both the monobenzyl and the dibenzyl ethers of stilbestrol in approximately equal amounts. It has been found, however, that these substances may be readily separated on the basis of their solubility, since the monobenzyl ether is quite soluble in ethyl ether whereas the dibenzyl ether (of stilbestrol) is practically insoluble in the named solvent. In consequence, a useful yield of the pure monobenzyl ether may be readily obtained, in a direct manner, by benzylating diethylstilbestrol.

It has also been found that the dibenzyl ether of stilbestrol can be treated by various debenzylating procedures to afford substantial conversion to the monobenzyl ether. For example, such debenzylating treatment can involve refluxing the dibenzyl ether (of stilbestrol) in a high boiling solvent such as diethyleneglycol or its monomethyl ether (Carbitol) with potassium hydroxide, or by treating the alcoholic solution with an acid such as a hydrogen halide.

Alternatively the dibenzyl ether of diethylstilbestrol can be prepared from di-p-benzyloxy-desoxybenzoin through condensation with ethyl bromide to di-p-benzyloxyethyldesoxybenzoin which with ethylmagnesium bromide will yield 3,4-di-p-benzyloxyphenyl-3-hexanol which is dehydrated to the dibenzyl ether of diethylstilbestrol. The latter is then debenzylated, e. g. as explained above, to the desired monobenzyl ether of diethylstilbestrol.

The following is a specific example of the preparation of the new compound, it being understood that this set of operations is simply illustrative and that other procedures, e. g. as described above, may be satisfactorily employed in many cases.

In this example, the monobenzyl ether is directly prepared by benzylation of diethylstilbestrol. To 2100 cc. of absolute ethanol 25.7 grams (1.12 moles) of sodium are added, and after the sodium has completely dissolved 300 grams (1.12 moles) of diethylstilbestrol are added. The mixture is warmed to reflux temperature and 141 grams (1.12 moles) of benzyl chloride are added dropwise under continuous stirring. The reaction mixture is refluxed for 4 hours and then allowed to stand at room temperature for 18 hours. The mixture is filtered and the filtrate concentrated in vacuo. The residue as well as the alcohol-insoluble material are extracted with diethyl ether to dissolve the monobenzyl ether and the unreacted diethylstilbestrol, the dibenzyl ether remaining undissolved. The combined fractions of the solvent (ether) are washed with water and subsequently with 3 portions of 0.4 normal potassium hydroxide solution to extract the unreacted diethylstilbestrol. The ether solution is then again washed with water, decolorized with activated charcoal, filtered, dried with anhydrous sodium sulfate, filtered again, and concentrated in vacuo. The residue thus obtained is recrystallized from hot ethanol. The crystalline product, being the desired monobenzyl ether of diethylstilbestrol, was found to have a melting point of 128–130° C. Yield: 121 grams.

As prepared in the foregoing or other ways, the novel substance, which has been found to possess valuable new properties as explained above, is the monobenzyl ether of diethylstilbestrol, which may alternatively be denominated 3 - (p - benzyloxyphenyl) - 4 - (p - hydroxyphenyl)-3,4-hexene and which is understood to have the structural formula:

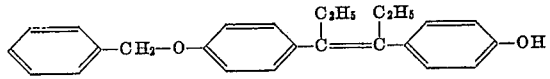

It is to be understood that the invention is not limited to the specific procedures herein described but may be carried out in other ways without departure from its spirit.

What is claimed is:

Monobenzyl ether of diethylstilbestrol.

MARGARETE SCHMELKES,
*Executrix of the last will and testament of Frank Charles Schmelkes, deceased.*

References Cited in the file of this patent

UNITED STATES PATENTS

| Number | Name | Date |
|---|---|---|
| 2,346,048 | Rohrmann | Apr. 4, 1944 |
| 2,385,468 | Reid | Sept. 25, 1945 |